Nov. 3, 1970  A. B. NEALE  3,537,802
RADIAL FLOW TURBINE

Filed Dec. 9, 1968

INVENTOR.
*Abas B. Neale*
By
*Miketta, Glenny, Poms & Smith*
ATTORNEYS.

Nov. 3, 1970      A. B. NEALE      3,537,802
RADIAL FLOW TURBINE
Filed Dec. 9, 1968      2 Sheets-Sheet 2
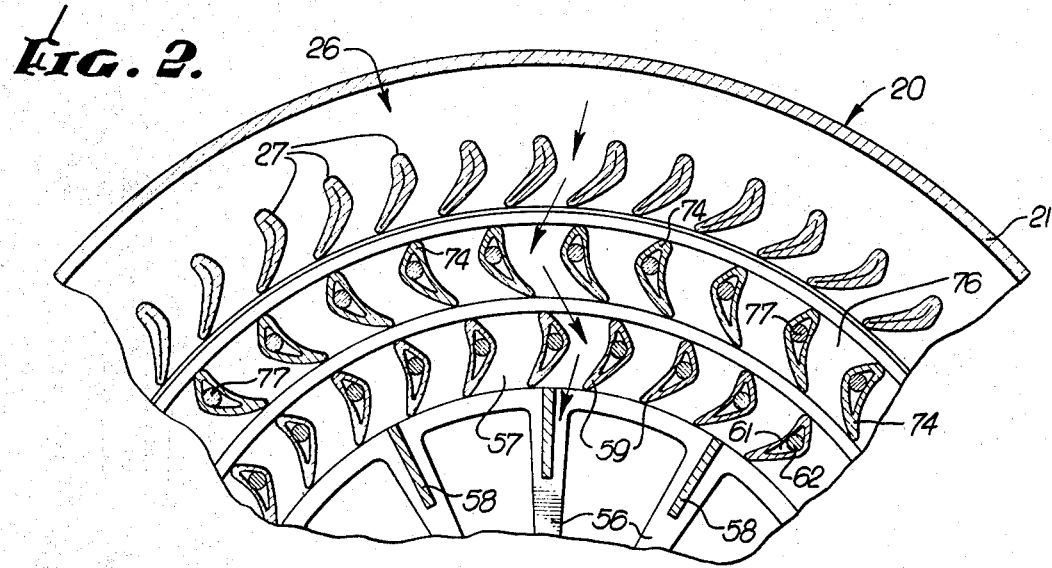
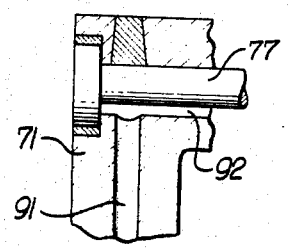
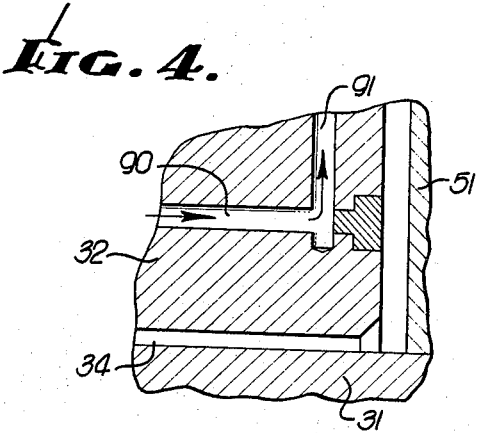
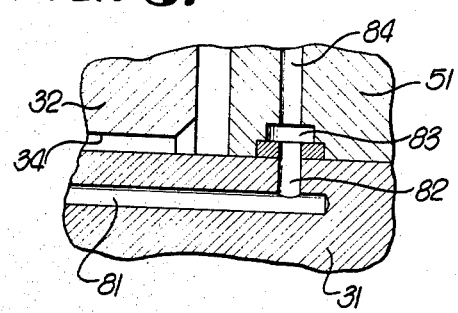
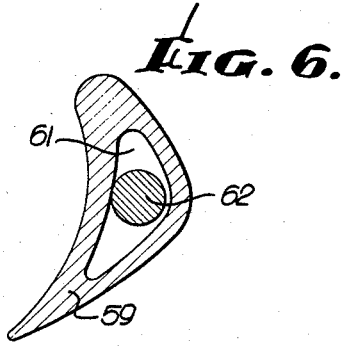
INVENTOR.
ABAS B. NEALE
BY
Miketta, Glenny, Pome & Smith
ATTORNEYS.

United States Patent Office 3,537,802
Patented Nov. 3, 1970

3,537,802
RADIAL FLOW TURBINE
Abas B. Neale, 3172 Ellington Drive,
Hollywood, Calif. 90028
Filed Dec. 9, 1968, Ser. No. 782,111
Int. Cl. F01d 1/08
U.S. Cl. 415—64                           5 Claims

ABSTRACT OF THE DISCLOSURE

A radial flow turbine having a pair of oppositely rotating concentric turbine shafts each of which carries an annular disc, the inner disc having a concave peripheral wall traversed by a plurality of circumferentially spaced turbine blades and the outer disc comprising two walls axially spaced on opposite sides of the first disc and larger in diameter than the first disc and also having a plurality of circumferentially spaced turbine blades traversing the first annular disc.

---

Figure 1:
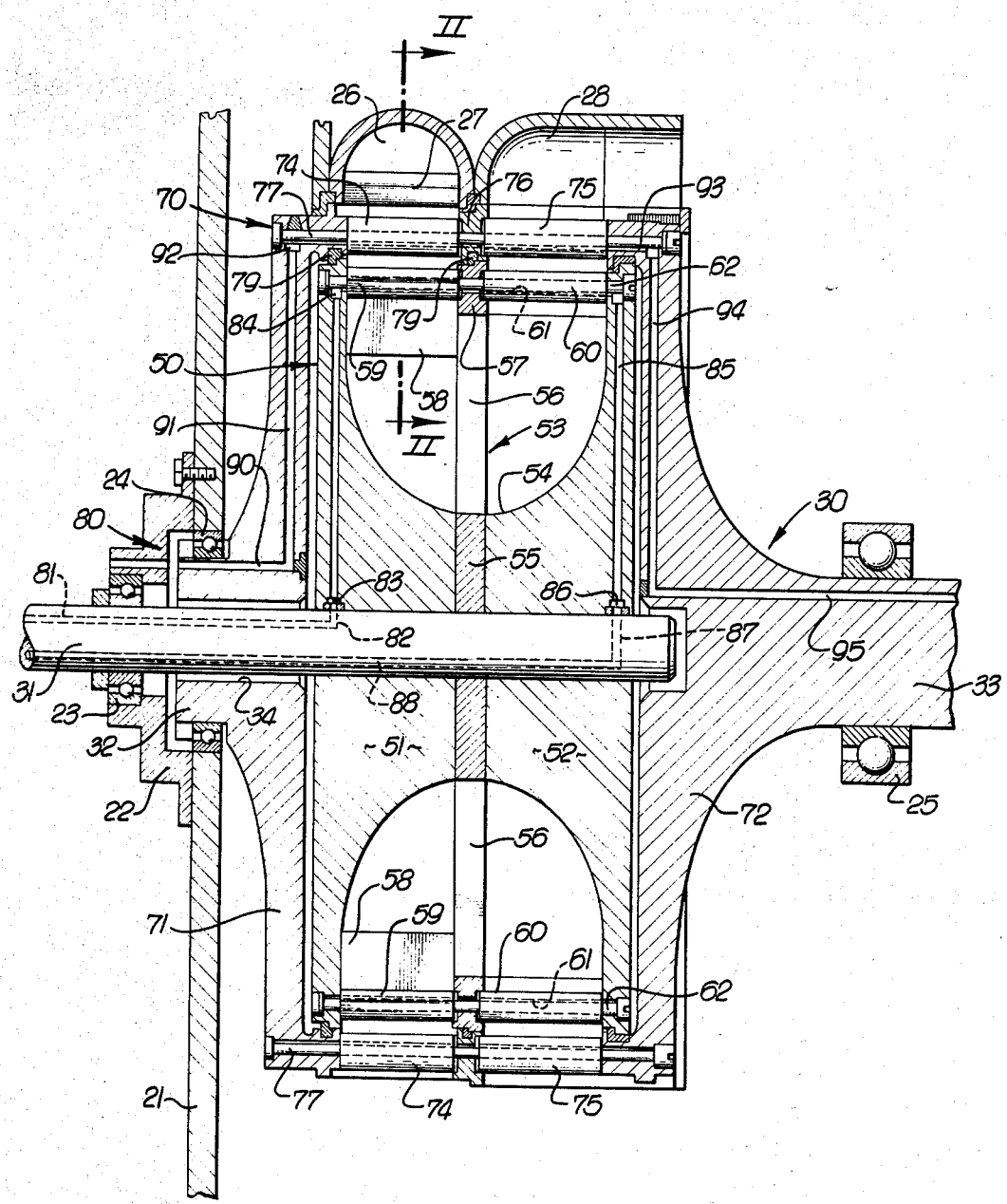

The turbine engine converts heat energy in the working fluid to kinetic energy which in turn is transformed into mechanical energy. Such mechanical energy is present in the rotation of the turbine shaft which may be connected to a compressor, as in a gas turbine engine, to accomplish the necessary gas compression phase of the cycle. In radial flow turbine engines, the working fluid passes radially inwardly from a casing and traverses a series of turbine blades forming one or multiple stages to accomplish the transformation of heat energy to mechanical energy. One important limitation on turbine performance is the maximum peripheral velocity U of the turbine wheel. The efficiency of the turbine is dependent upon the ratio of the turbine disc peripheral velocity U of the gas velocity V. High efficiency, or maximum energy conversion, in each stage of a gas turbine engine requires that the peripheral velocity U is substantially the same in each stage of the turbine. However, this is not possible in multistage counter-rotating radial turbines or in axial turbines.

Another limitation to the performance characteristics of turbine engines is the stresses created in the turbine disc and the turbine blade roots due to bending moments in the cantilevered blade due to centrifugal forces of the rotating disc. Prior art radial flow engines, however, have invariably used cantilevered turbine blades and have thus been plagued with serious stress problems thereby limiting the maximum rotational speed of the turbine.

A further limitation to the performance of turbine engines is the temperature at which the turbine wheel or disc and particularly the turbine blade, can operate. Turbine elements have been cooled in the prior art by a closed cycle system in which the coolant after passing through the turbine blades and discs is recooled and recirculated or an open cycle system. In the open cycle system, bleed air from the engine compressor is passed through the turbine blades and discs and discharged. Air cooling however is not very effective for use with high turbine blade temperatures since discharge of the air into the stream of hot gases will result in lowering of the gas stream temperature with consequent loss of power. Moreover, in the case of counter-rotating radial turbines, effective cooling is particularly difficult because of the necessity for a multiplicity of entry and exit coolant channels which weakens the disc and blade structures.

In radial turbine engines, another problem resides in the axial thrust loads that are imparted to the turbine disc due to the nonplanar entry and exit of the working fluid.

Accordingly, it is one object of the present invention to provide a counter-rotating radial flow turbine engine having concentric counter-rotating turbine discs providing considerable shatf power while being compact in size.

Another object of the present invention is to provide a radial flow turbine having concentric counter-rotating turbine discs and supporting a plurality of circumferentially spaced turbine blades at both ends so as to minimize stresses due to centrifugal force of the rotating discs.

One more object of the present invention is to provide a radial flow turbine engine of the last-described type in which each of the blades are provided with a coolant passage in fluid communication with radially disposed coolant passages formed in the turbine discs providing a closed cycle coolant system so as to reduce thermal stresses in the turbine discs and blades.

Still one more object of the present invention is to provide a radial flow turbine engine having concentric counter-rotating turbine discs supporting circumferentially spaced turbine blades, each of the blades being supported as a simple beam and each of the blades being cooled so as to eliminate thermal and structural stress allowing the turbine to rotate at higher angular velocities so as to improve compressor efficiency.

Yet one more object of the present invention is to provide a radial flow turbine engine of the above-described type in which the working fluid is passed radially inwardly from the casing of the engine traversing the turbine blades in one or more stages and acting upon the turbine disc so as to produce substantially equal and oppositely directed axial thrust loads which are substantially cancelled.

Another important object of this invention is to provide a turbine in which the gas temperature may be substantially greater than in prior art turbines so that complete combustion is possible thereby eliminating obnoxious exhaust gases that pollute the atmosphere.

Other objects and many of the attendant advantages of this invention will be readily appreciated as the same become better understood by reference to the following detailed description when considered in connection with the accompanying drawings.

Generally stated, the radial flow turbine for converting the energy of a working fluid into mechanical energy of the present invention includes a casing having inlet and outlet means for directing the working fluid generally radially inwardly and outwardly, and two shafts adapted for rotation in opposite directions and centrally coaxially mounted with respect to the casing, each of the shafts carrying at least one annular disc, one of the annular discs having a concave peripheral wall defining a circumferentially extending passage for admission of such working fluid and a plurality of circumferentially spaced turbine blade means traversing the circumferential passage, and another of the annular discs on the oppositely rotating shaft being of larger diameter and including first and second circular walls axially spaced on opposite sides of the first annular disc and also including a plurality of turbine blade means mounted in the peripheral portions of the walls radially outwardly of the first annular disc turbine blade means and also traversing the passage so that the turbine blade means traversing the inward flow of the working fluid comprise first and second turbine stages while the blade means traversing the outward flow of the working fluid comprise third and fourth turbine stages.

In the drawings:
FIG. 1 is a vertical section view of an exemplary embodiment of a radial flow turbine engine constructed in accordance with the present invention;
FIG. 2 is an end sectional view taken along the plane II—II of FIG. 1;
FIG. 3 is a detailed sectional view of a portion of one of the turbine disc water passages;
FIG. 4 is a detailed view of another portion of the turbine disc water passage;

FIG. 5 is still another detailed view of a portion of one of the annular disc water passages; and FIG. 6 is a section view of one of the turbine blade means of FIG. 1.

Referring now to the drawings, there is shown an exemplary embodiment of a portion of a radial flow gas turbine engine constructed in accordance with the present invention. Such gas turbine engine generally comprises a casing indicated generally at 20, shaft means indicated generally at 30, first annular disc means indicated generally at 50, and second annular disc means indicated generally at 70. The exemplary gas turbine engine also includes water passage means indicated generally at 80.

Casing or housing 20 includes a generally planar annular support wall 21 extending radially inwardly from a cylindrical outer casing wall (not shown). Support wall 21 includes a centrally located opening for receiving shaft means and a bearing housing 22 supporting bearing 23. In the central opening of support wall 21, there is provided a bearing 24 for rotatably supporting the engine shaft means. The shaft means is also supported at its other end by second bearing 25 which may also be suitably mounted in the casing of the engine.

Casing 20 also includes gas or working fluid inlet means indicated at 26. The exemplary embodiment of the radial flow turbine illustrated admits gas to the turbine in a radially inwardly directed flow path, the direction of which is controlled by nozzles 27, which may be variable, supported in the inlet means 26. Gas outlet means 28 is also provided in casing 20 for discharge of the gas from the turbine section.

The counter-rotating radial flow turbine also includes shaft means indicated generally at 30, which in the exemplary embodiment includes first shaft means 31 for rotating in a first direction and second shaft means including first shaft portion 32 and second shaft portion 33 for rotating in an opposite direction. First shaft portion 32 is supported in bearing 24 and second shaft portion 33 is supported in bearing 25. Forward shaft portion 32 includes a centrally disposed bore 34 through which first shaft means 31 passes.

The counter-rotating radial flow turbine also includes first inner annular disc means 50 which, in the exemplary embodiment, comprises three axial sections including a forward annular section 51, a rearward annular section 52, and an intermediate annular section 53. Forward and rearward annular sections 51, 52 include concave peripheral wall means indicated at 54 defining a circumferentially extending U-shaped passage or fluid guide surface for the working fluid or gas from the casing inlet 26. The intermediate section 53 comprises a spoked wheel including a hub 55, spokes 56 and a rim 57, as seen in FIG. 2. Supported between the spokes 56 and the forward annular member 51, are a plurality of circumferentially spaced planar baffles 58 for straightening the gas flow path as it exits from the turbine blade means.

In the exemplary embodiment, the turbine blade means of the first annular disc comprises a plurality of circumferentially spaced blade portions indicated at 59 and 60. Each of such blade portions is hollow and is supported at both ends, as a simple beam, by the forward and rearward annular members and the intermediate annular member. One of such blade portions 59 is shown in cross-section in FIG. 6, illustrating the hollow portion 61 through which rod 62 passes. The other blade portion 60 has a different cross-sectional shape as dictated by the working fluid conditions when traversing such blade portions. Each end of rod 62 is provided with a head or nut received within countersunk holes in the peripheral portion of the annular members 51, 52 so as to support the blade portions in a position traversing the concave wall 54. Such blade portions, depending upon other design parameters, may be of the reaction, impulse or combination types. Rod 62 may have any cross-sectional shape. While blade portions 59, 60 could be integral, the change in cross-sectional shape can be best accommodated by employing intermediate annular member 53.

The radial flow turbine also includes second outer annular disc means 70 comprising first and second circular walls 71, 72 respectively, axially spaced and on opposite sides of first annular disc 50 and of larger diameter than the diameter of the annular sections 51, 52 and 53. The second annular disc 70 is mounted on integral shafts 32, 33. Carried in the peripheral portions of circular walls 71, 72 is circumferentially spaced turbine blade means disposed radially outwardly of the first annular disc turbine blade means and traversing the circumferentially extending passage defined by the concave peripheral wall means 54. Such blade means comprises blade portions 74 and 75, the ends of which are supported by first and second circular walls 71, 72 and an intermediate annular member 76 supported by the rod 77. The blade portions 74, 75 are hollow, as are the blade portions of the turbine blade means of the inner annular disc 50. The high tensile strength support rod is passed through suitable openings in the periphery of the circular walls 71, 72 through the hollow blade portions 74, 75 and the intermediate member 76 so as to fix the circular walls 71, 72 with respect to one another. Rod 77 is provided with suitable head and nut means for securing the blade portions to the circular walls. It will be readily seen that the turbine blade means of the second outer annular disc 70 traverses the circumferentially extending passage defined by the first annular disc so that first blade portions 59 and 74 define first and second turbine stages and the other blade portions 60 and 75 define third and fourth turbine stages.

In operation, the two shafts an annular discs rotate oppositely (or the inner disc remains fixed) and a working fluid is passed through the nozzles 27 of the inlet means 26 of the casing through the first and second turbine stages defined by the blade portions 59, 74 so as to be directed against the concave peripheral wall means 54 wherein its flow direction is reversed 180° so that it passes across the third and fourth turbine stages comprising the blade portions 60, 75 and is discharged through the casing outlet 28. Suitable sealing means, such as indicated at 79, are provided for preventing the escape of gas between the two counter-rotating turbine annular discs.

In the exemplary embodiment, the counter-rotating radial flow turbine is provided with a closed cooling system. Such cooling system comprises a plurality of flow passages through each of the annular discs. In the first annular disc means 50, the shaft means 31 is provided with an inlet coolant passage 81, as seen in FIG. 5, axially aligned with the axis of the shaft. Passage 81 terminates in a radially directed passage 82 in fluid communication with an annular opening 83 in forward annular section 51. A plurality of coolant passages 84 extend radially from annular passage 83 to a second annular flow passage 84 in the outer peripheral region of forward wall 51 which is in fluid communication with the circumferentially spaced openings in forward section 51 through which each of the rods 59 pass. The coolant will therefore pass through the hollow blade portions through the same opening through which the rod 61 passes. Rearward annular section 52 is provided with a coolant outlet passage 85 extending radially inwardly to an annular opening 86 in fluid communication with a radial passage 87 in shaft means 31 and an axially aligned outlet flow passage 88.

The second outer annular disc 70 is also provided with a closed coolant system comprising an inlet passage 90 (see FIG. 5) through shaft portion 32 in fluid communication with a plurality of radially extending inlet passages 91 in fluid communication with a plurality of openings 92 for receiving the rod 77 that supports the second annular disc turbine blade means. Again, the coolant may pass through the passage 92 in wall 71 into the turbine blade portion 74 through the intermediate annular member 76, through blade portion 75 and into aligned passage 93 in rearward wall 72. Each of the passages 93 through which the rod 77 and the coolant passes, is in fluid communication with radial fluid passages 94 extending toward the hub of circular wall 72 and terminating in axial flow passage 95.

It will therefore be appreciated that the exemplary embodiment of the counter-rotating radial flow turbine of the present engine is provided with a closed coolant system wherein the cooling fluid, such as water or the like, passes through the turbine discs and through the turbine blade means so as to cool the entire turbine section.

It will now be understood from the above description in conjunction with the drawings that the present invention provides a counter-rotating radial flow turbine in which both mechanical and heat stress is minimized so as to improve performance characteristics of the engine by permitting a higher angular velocity of the turbine section. Difficulties in mechanical strength inherent in cantilever turbine blades are entirely avoided in the present invention through the support of the turbine blade as simple beams. Having thus explained in detail an exemplary embodiment of the present invention, it should be noted by those skilled in the art that the embodiment thus described herein is exemplary only.

It will be understood that the inner annular disc can be held fixed to act as vane guides and stationary nozzles for the outer annular disc where compatible subassemblies of the turbine require such operation.

I claim:

1. In a counter-rotating radial flow turbine including a casing, two shaft means adapted for rotation in opposite directions and centrally coaxially mounted with respect to the casing, and at least one annular disc mounted on each of the shafts, the improvement comprising:
   one of said annular discs provided with concave peripheral wall means defining a circumferentially extending passage for admission of a working fluid in a generally radially inward flow and successive outward flow, including a pluraliy of circumferentially spaced turbine blaed means supported at each end in the peripehral portion of said disc and traversing said passage; and
   another of said annular discs on the oppositely rotating shaft being of larger diameter including first and second circular walls axially spaced on the opposite sides of said first annular disc, including a plurality of turbine blade means supported at each end in the peripheral porions of said walls radially outward of said first annular disc turbine blade means and traversing said passage;
   said turbine blade means traversing the inward flow of said working fluid comprising first and second turbine stages and said blade means traversing the outward flow of said working fluid comprising third and fourth turbine stages.

2. The improvement of claim 1 wherein each of said blade means are hollow and are mounted to said discs through tie rods passing through said blade means openings and secured to said discs.

3. The improvement of claim 2 wherein each of said annular discs are provided with radially directed cooling fluid inlet and outlet passage means in fluid communication with said blade means openings.

4. The improvement of claim 2 wherein said first annular disc comprises first and second annular members including complementary portions of said concave peripheral wall means, and an intermediate annular section mounted between said first and second annular sections and including a peripheral wall portion with circumferentially spaced bores for receiving said tie rods, and each of said blade means comprises a pair of blade supported at one end by said first and second annular sections and at the other end by said intermediate annular section.

5. In a counter-rotating radial flow turbine including a casing and inlet and outlet means for direcing working fluid generally inwardly and outwardly, the provision of:
   an inner shaft centrally mounted in said casing for rotation in a first direction;
   a first annular disc mounted on said inner shaft including circumferential concave wall means and a plurality of circumferentially spaced turbine blade means mounted on said disc traversing said concave wall means;
   an outer shaft concentrically mounted for rotation in an opposite direction; and
   a pair of circular walls mounted on said outer shaft on opposite sides of said first annular disc, each of said walls having a diameter greater than the diameter of said first annular disc, and a plurality of circumferentially spaced turbine blade means mounted in the peripheral portions of said walls traversing said first annular disc;
   whereby each end of said turbine blade means are supported and the working fluid passes radially inwardly and outwardly through said turbine blade means.

References Cited
UNITED STATES PATENTS

| 996,324 | 6/1911 | De Ferranti | 253—16.5 X |
| 2,471,892 | 5/1949 | Price | 253—16.5 X |

FOREIGN PATENTS

| 537,917 | 11/1931 | Germany. |
| 99,741 | 8/1940 | Sweden. |

EVERETTE A. POWELL, JR., Primary Examiner